US011889859B2

(12) United States Patent
Liu

(10) Patent No.: US 11,889,859 B2
(45) Date of Patent: Feb. 6, 2024

(54) HOOKAH

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 600 days.

(21) Appl. No.: 17/096,943

(22) Filed: Nov. 12, 2020

(65) Prior Publication Data

US 2021/0274836 A1 Sep. 9, 2021

(30) Foreign Application Priority Data

Mar. 9, 2020 (CN) ......................... 202010156095.1
Mar. 9, 2020 (CN) ......................... 202020275830.6

(51) Int. Cl.

| | |
|---|---|
| ***A24F 13/00*** | (2006.01) |
| ***A24F 1/30*** | (2006.01) |
| ***A24F 40/465*** | (2020.01) |
| ***A24F 40/20*** | (2020.01) |
| ***A24F 40/51*** | (2020.01) |
| ***A24F 1/32*** | (2006.01) |
| ***H05B 6/06*** | (2006.01) |
| ***H05B 6/10*** | (2006.01) |
| ***H05B 6/36*** | (2006.01) |

(52) U.S. Cl.

CPC .................. *A24F 1/30* (2013.01); *A24F 1/32* (2013.01); *A24F 40/20* (2020.01); *A24F 40/465* (2020.01); *A24F 40/51* (2020.01); *H05B 6/06* (2013.01); *H05B 6/105* (2013.01); *H05B 6/36* (2013.01)

(58) Field of Classification Search

CPC ........................................................ A24F 47/00
USPC .................................................. 131/328–329
See application file for complete search history.

(56) References Cited

U.S. PATENT DOCUMENTS

2017/0055583 A1* 3/2017 Blandino .............. A24F 40/465
2017/0251718 A1* 9/2017 Armoush .................. A24F 1/30
2017/0325500 A1* 11/2017 Senftleben .............. A24F 13/14
2022/0087313 A1* 3/2022 Shepelev ............. H05B 1/0227

* cited by examiner

*Primary Examiner* — Phuong K Dinh
(74) *Attorney, Agent, or Firm* — MATTHIAS SCHOLL P.C.; Matthias Scholl

(57) ABSTRACT

A hookah includes a high-frequency heating assembly and a battery assembly connected to the high-frequency heating assembly. The high-frequency heating assembly includes a cup, a metal sheet, and a magnetic induction coil. The cup includes high-temperature resistant non-metallic material and is configured to accommodate a tobacco material. The metal sheet is fixed in the cup and the cup is disposed in the magnetic induction coil. When the magnetic induction coil is electrified, an eddy current is generated in the metal sheet whereby the metal sheet produces heat to heat the tobacco material.

6 Claims, 7 Drawing Sheets

HOOKAH

CROSS-REFERENCE TO RELATED APPLICATIONS

Pursuant to 35 U.S.C. § 119 and the Paris Convention Treaty, this application claims foreign priority to Chinese Patent Application No. 202010156095.1 filed Mar. 9, 2020, and to Chinese Patent Application No. 202020275830.6 filed Mar. 9, 2020; the contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a hookah.

Conventionally, the smoke-producing material of a hookah is ignited by open fire, and the smoke volume produced by the hookah is unregulatable.

SUMMARY

A hookah comprises a high-frequency heating assembly and a battery assembly connected to the high-frequency heating assembly. The high-frequency heating assembly comprises a cup, a metal sheet, and a magnetic induction coil; the cup comprises high-temperature resistant non-metallic material and is configured to accommodate a tobacco material; the metal sheet is fixed in the cup and the cup is disposed in the magnetic induction coil; and when the magnetic induction coil is electrified, an eddy current is generated in the metal sheet whereby the metal sheet produces heat to heat the tobacco material.

In a class of this embodiment, the cup comprises an upper cover and the upper cover comprises a plurality of through holes.

In a class of this embodiment, the metal sheet is in the form of mesh, cross shape, fan shape, or spiral shape.

In a class of this embodiment, the high-frequency heating assembly further comprises a temperature sensor configured to sense a temperature change of the hookah.

In a class of this embodiment, the high-frequency heating assembly further comprises a thermal insulation cylinder disposed between the cup and the magnetic induction coil to protect the magnetic induction coil.

In a class of this embodiment, the thermal insulation cylinder and the cup each comprise high-temperature resistant glass.

In a class of this embodiment, the battery assembly comprises a plurality of batteries connected in series or in parallel.

In a class of this embodiment, the high-frequency heating assembly further comprises a base and a control panel; the magnetic induction coil is fixed on the base and a lead thereof runs through the base; an output end of the control panel is soldered on the lead of the magnetic induction coil to supply power to the magnetic induction coil.

In a class of this embodiment, the high-frequency heating assembly further comprises a first insulation ring, a positive electrode, and a negative electrode; the temperature sensor is disposed on the base and below the magnetic induction coil; the first insulation ring is disposed on the base to separate positive and negative leads of the temperature sensor; the positive electrode is disposed in the first insulation ring and is connected to the positive lead of the temperature sensor and an input positive electrode of the control panel; the negative electrode is disposed outside the first insulation ring and is connected to the negative lead of the temperature sensor and an input negative electrode of the control panel; the control panel is disposed on a screw thread of the negative electrode and fixed on the base to receive temperature information of the temperature sensor.

In a class of this embodiment, the hookah further comprises a smoke filter, a first air passage, and a second air passage; the smoke filter is filled with appropriate water. The first air passage comprises a first end connected to the high-frequency heating assembly and a second end submerged in the water; the second air passage comprises a first end connected to a mouthpiece and a second end disposed above the liquid level of the water; when in use, the smoke produced by the high-frequency heating assembly enters the water via the first air passage, is filtered by the water, comes out of the water, enters the second air passage, and is inhaled by a user.

The hookah comprises the high-frequency heating assembly so that the tobacco material is heated through the electromagnetic induction heating instead of open fire. The hookah comprises the temperature sensor which can provide over-temperature protection for the hookah. The hookah is designed modularly, which facilitates the replacement of the tobacco material. The battery comprises six or more than six battery cells connected in series or in parallel, which can output higher voltage and improve heating efficiency of the hookah.

DETAILED DESCRIPTION

Figure 1:
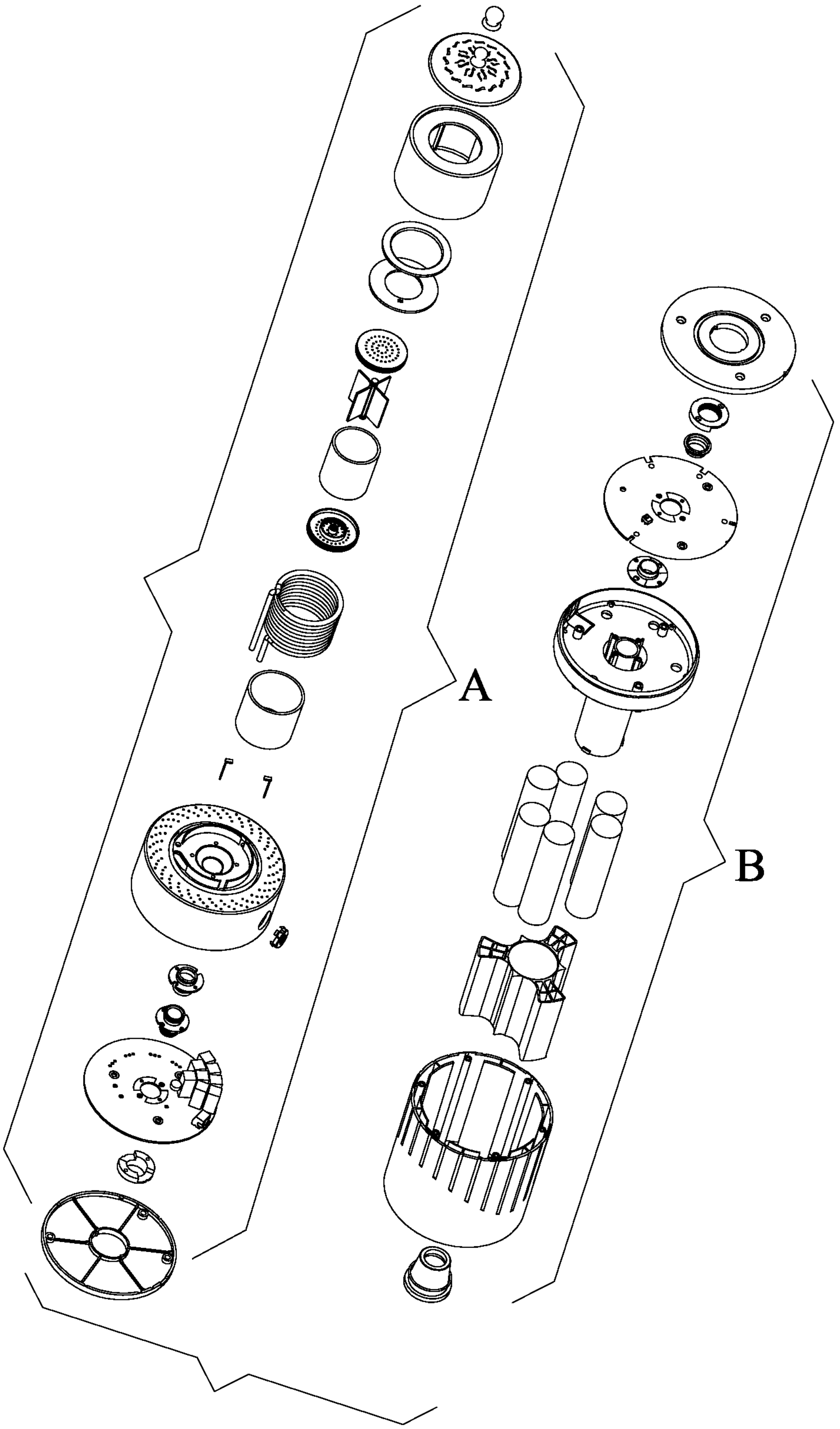
FIG. 1 is an exploded view of a hookah in accordance with one embodiment of the disclosure.
Figure 2:
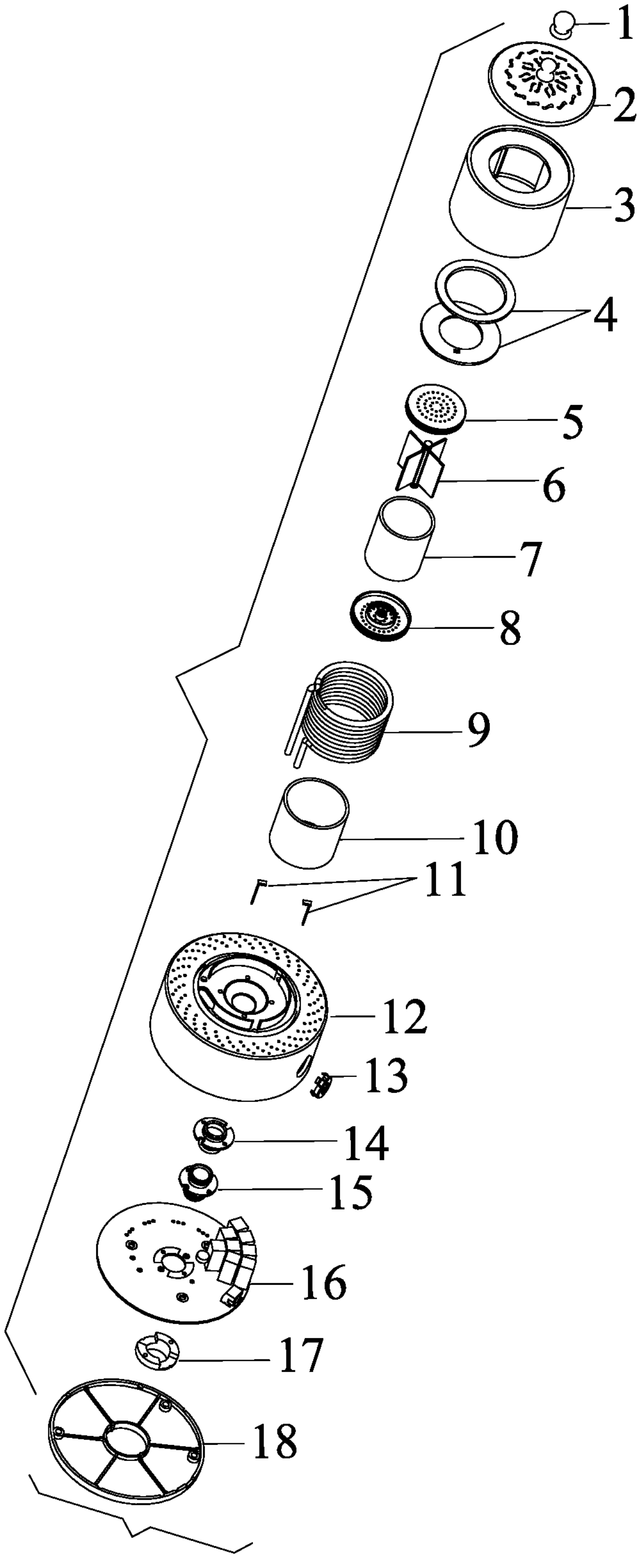
FIG. 2 is an exploded view of a high-frequency heating assembly of a hookah in accordance with one embodiment of the disclosure.
Figure 3:
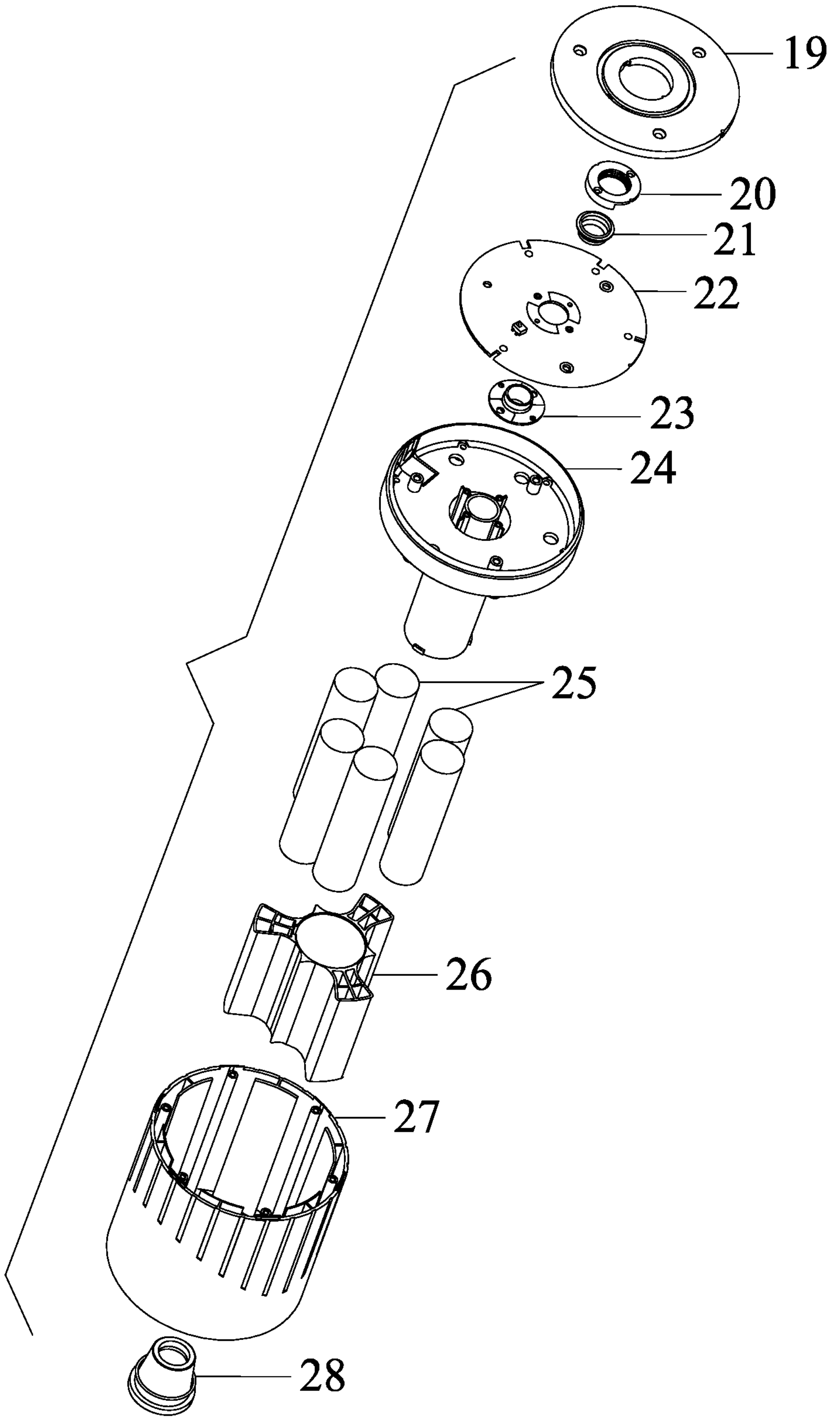
FIG. 3 is an exploded view of a battery assembly of a hookah in accordance with one embodiment of the disclosure.
Figure 4:
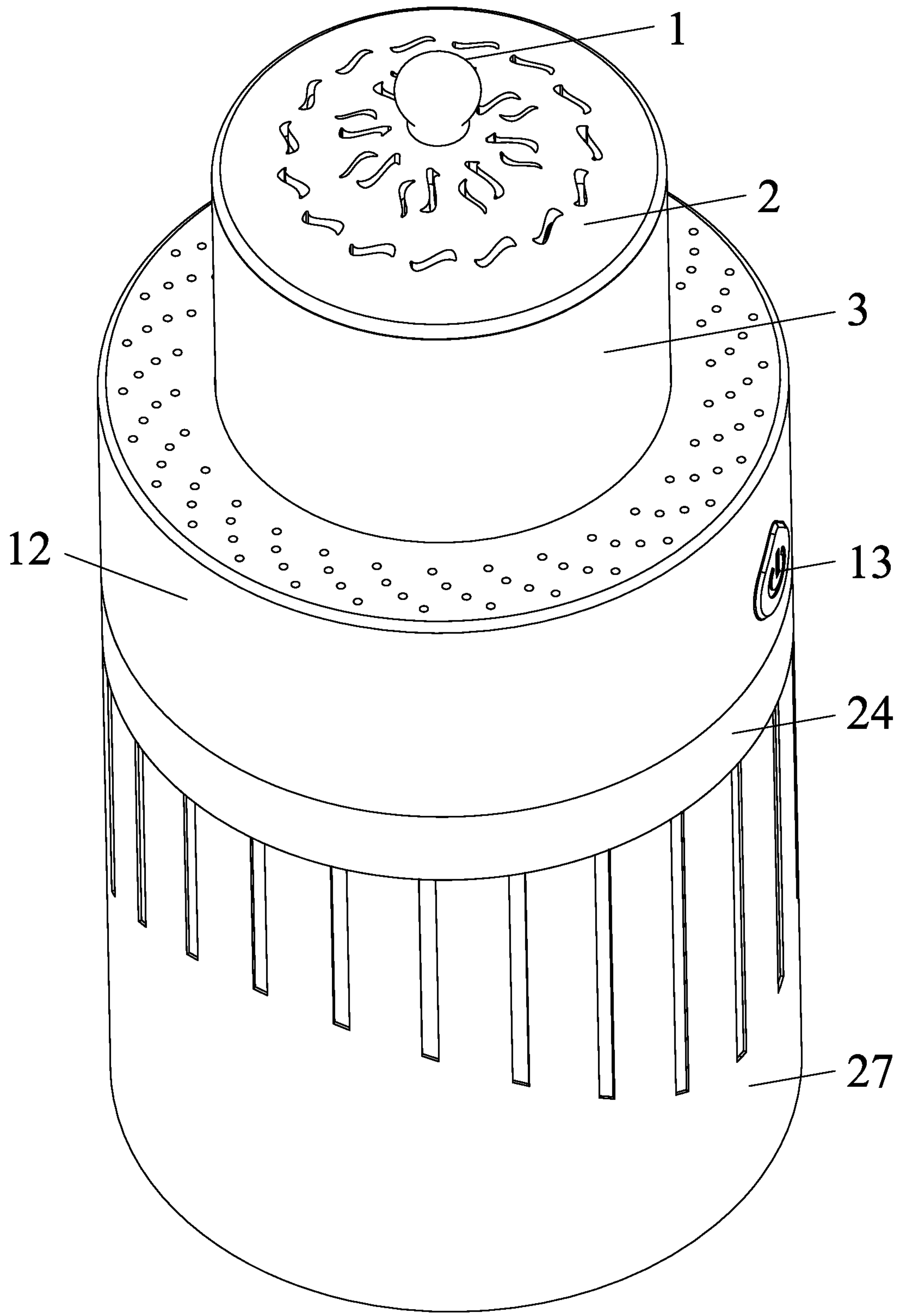
FIG. 4 is a schematic diagram of a hookah in accordance with one embodiment of the disclosure.
Figure 5:
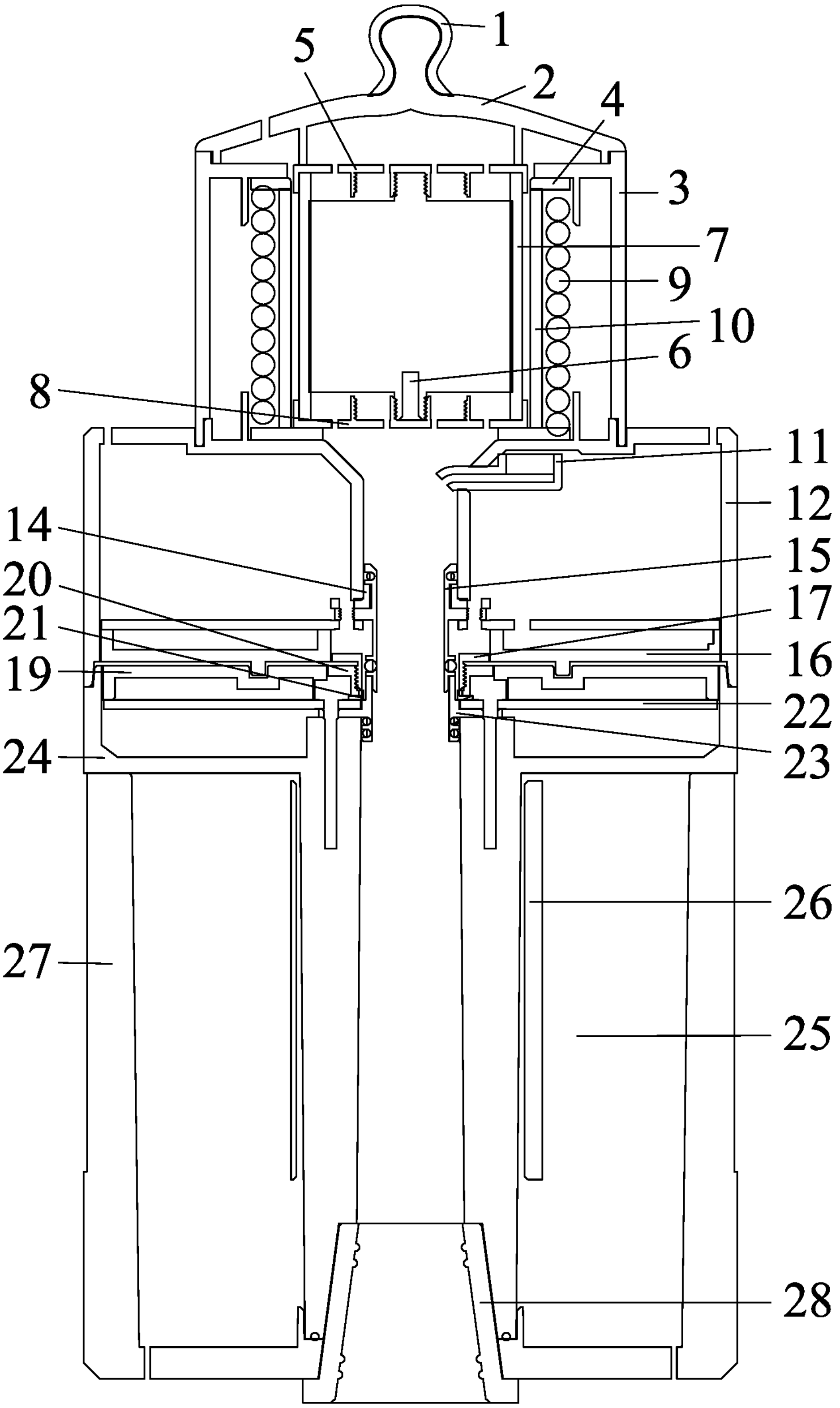
FIG. 5 is a sectional view of a hookah in accordance with one embodiment of the disclosure.

To further illustrate the disclosure, embodiments detailing a hookah are described below. It should be noted that the following embodiments are intended to describe and not to limit the disclosure.

In this disclosure, a tobacco material is heated through electromagnetic induction heating. Specifically, the hookah comprises a metal sheet and a magnetic induction coil, and the metal sheet is disposed in the magnetic induction coil. When the magnetic induction coil is electrified, an eddy current is generated in the metal sheet whereby the metal sheet produces heat to heat the tobacco material.

Tobacco materials refer to smoke oil, tobacco and other materials used to produce smoke As shown in FIGS. 1-7, the disclosure provides a hookah comprising a high-frequency heating assembly A and a battery assembly B. The high-frequency heating assembly A comprises a silica handle 1, an end cover 2, a sleeve 3, a silica seal 4, an upper cover 5, a metal sheet 6, a cup body 7, a lower cover 8, a magnetic induction coil 9, a thermal insulation cylinder 10, a temperature sensor 11, a base 12, a power button 13, a first insulation ring 14, a positive electrode 15, a control panel 16, a negative electrode 17, and a bottom cover 18. The upper cover 5, the cup body 7, and the lower cover 8 form a cup to accommodate a tobacco material. The cup is entirely disposed in the magnetic induction coil 9 and can be entirely taken out of the magnetic induction coil 9. The upper cover 5 and the lower cover 8 each comprises a plurality of through holes. The thermal insulation cylinder 10 is disposed between the cup and the magnetic induction coil 9 to protect the magnetic induction coil 9. The cup and the heat insulation cylinder 10 are made of high-temperature resistant non-metallic material such as glass, ceramics, quartz, crystal, agate, and jade. In this embodiment, the cup and the heat insulation cylinder are made of glass. The metal sheet 6 is fixed in the cup. The metal sheet is in the form of mesh, cross shape, fan shape, or spiral shape. In this embodiment, the metal sheet is a cross shape. The magnetic induction coil 9 is fixed on the base 12 and a lead thereof runs through the base 12. The output end of the control panel 16 is soldered on the lead of the magnetic induction coil 9 to supply power to the magnetic induction coil 9. The temperature sensor 11 is disposed on the base 12 and below the magnetic induction coil 9 to sense the temperature of the metal sheet 6 thus exhibiting an over-temperature protection function. The first insulation ring 14 is disposed on the base 12 to separate the positive and negative leads of the temperature sensor 11. The positive electrode 15 is disposed in the first insulation ring 14 and is connected to the positive lead of the temperature sensor 11 and an input positive electrode of the control panel 16. The negative electrode 17 is disposed outside the first insulation ring 14 and is connected to the negative lead of the temperature sensor 11 and an input negative electrode of the control panel 16. The power button 13 is disposed on the power knob of the control panel 16. The control panel 16 is disposed on the screw thread of the negative electrode 17 and fixed on the base 12 to receive the temperature information of the temperature sensor 11 and control the temperature change. The bottom cover 18 is disposed on the bottom of the base 12. The silica seal 4 is disposed in the sleeve 3. The sleeve 3 is disposed around the magnetic induction coil 9. The end cover 2 is disposed on the top of the sleeve 3. The silica handle 1 is disposed on the end cover 2.

The battery assembly B comprises a battery cover 19, a negative contact 20, a second insulation ring 21, a power panel 22, a positive contact 23, a shell 24, a battery 25, a support 26, a housing 27, a silica connector 28. The second insulation ring 21 is disposed on the power panel 22 to separate the negative contact 20 from the positive contact 23. The positive contact 23 is disposed in the second insulation ring 21 to contact the positive output end of the power panel 22. The negative contact 20 is disposed outside the second insulation ring 21 to contact the negative output end of the power panel 22. The support 26 is disposed in the housing 27. The battery 25 is disposed on the support 26 and is soldered to the input end of the power panel 22. The shell 24 is disposed in the support 26 and fixed in the housing 27. The power panel 22 is disposed in the shell 24. The battery cover 19 is disposed on the shell 24. The silica connector 28 is disposed on the bottom of the housing 27. The high-frequency heating assembly is disposed on the battery assembly. The base 12 is disposed on the shell 24 whereby the high-frequency heating assembly is connected to the battery assembly.

Figure 6:
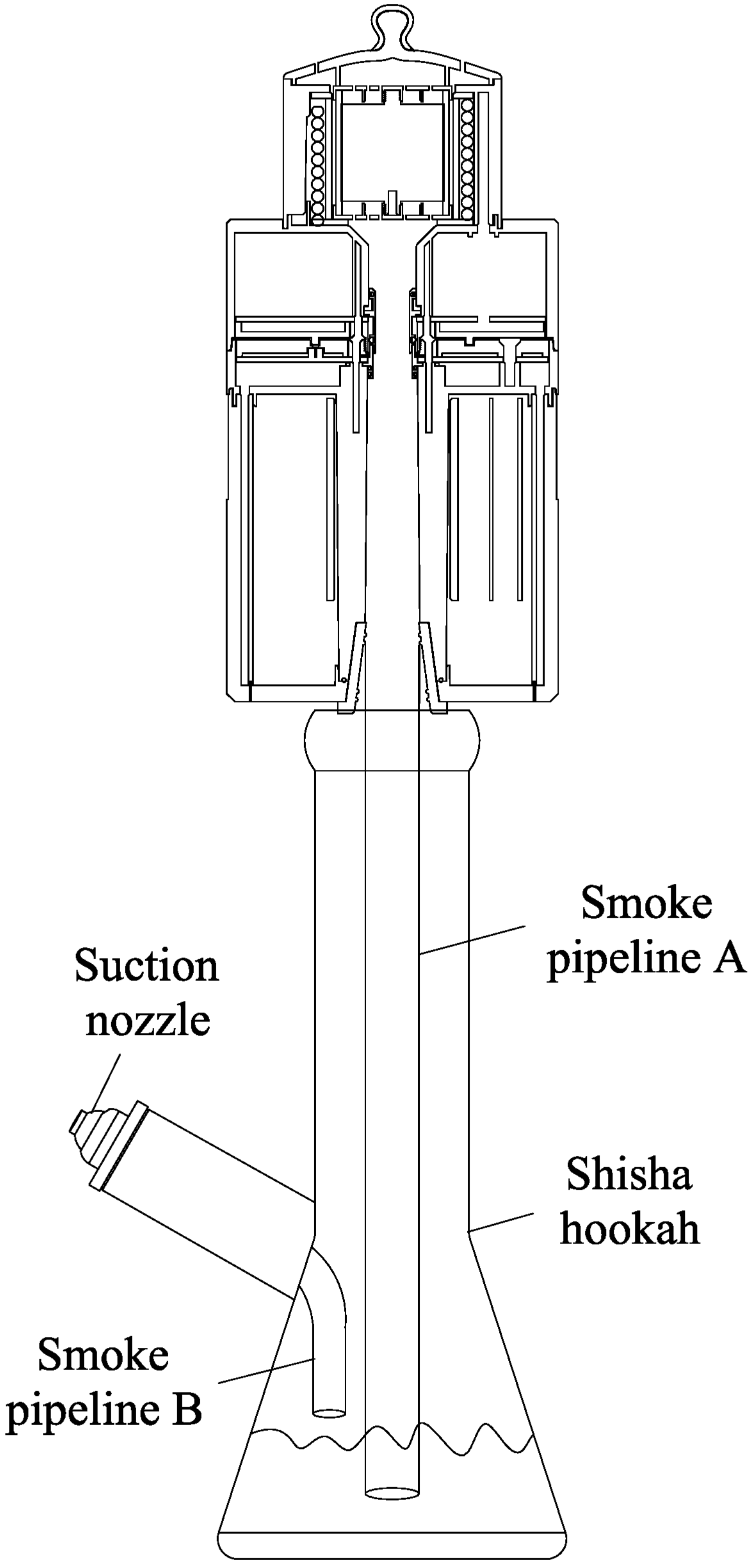
FIG. 6 is a connection diagram of a hookah comprising a smoke filter in accordance with one embodiment of the disclosure.
Figure 7:
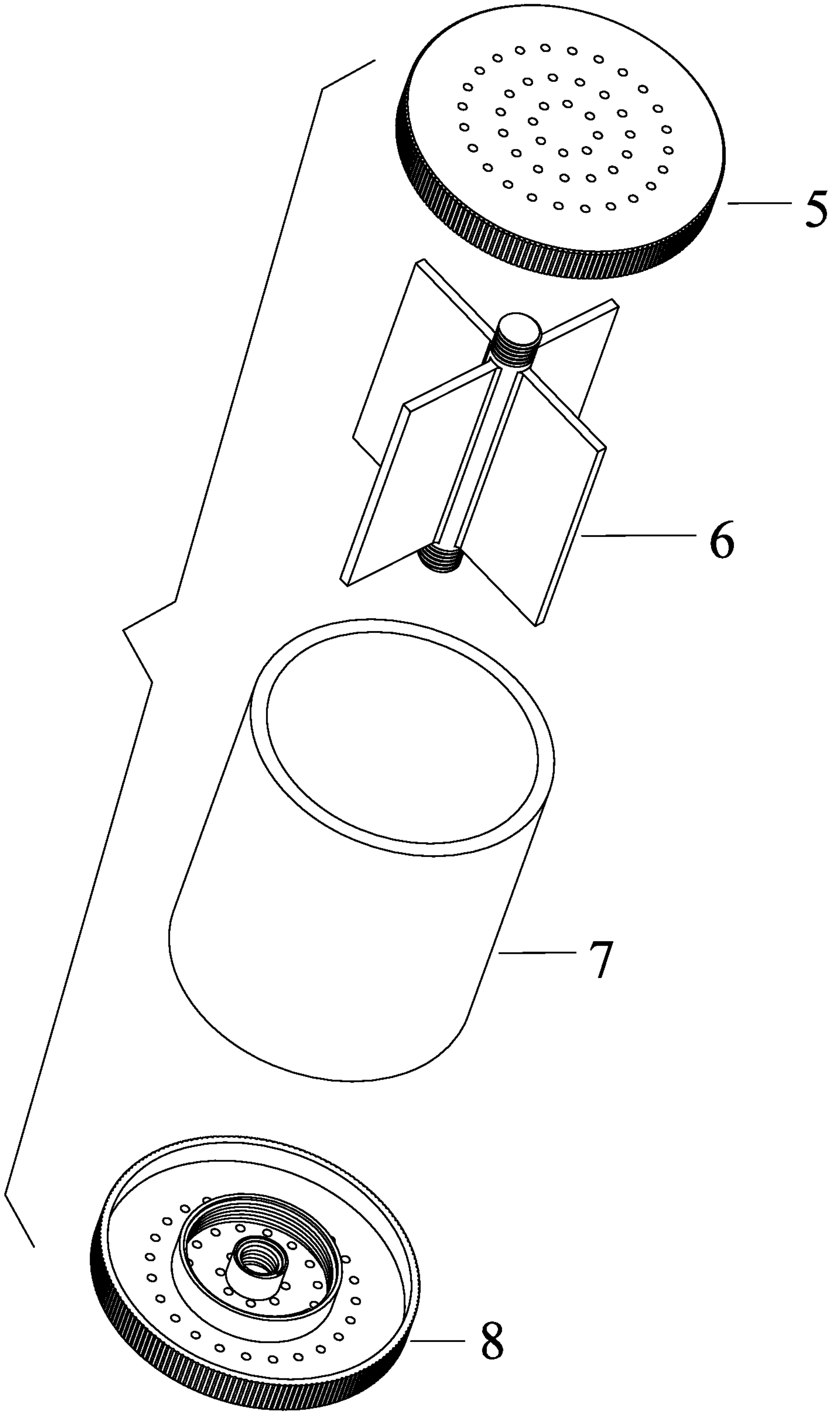
FIG. 7 is an exploded view of a cup for accommodating tobacco material in accordance with one embodiment of the disclosure.

FIG. 6 is a connection diagram of a hookah further comprising a smoke filter, a first air passage A, and a second air passage B. The smoke filter is filled with appropriate water. The first air passage A comprises a first end connected to the high-frequency heating assembly and a second end submerged in the water. The second air passage B comprises a first end connected to a mouthpiece and a second end disposed above the liquid level of the water. When in use, the smoke produced by the high-frequency heating assembly enters the water via the first air passage, is filtered by the water, comes out of the water, enters the second air passage, and is inhaled by a user.

The following advantages are associated with the hookah of the disclosure:

1. The hookah comprises the high-frequency heating assembly so that the tobacco material is heated through the electromagnetic induction heating instead of open fire.
2. The hookah comprises the temperature sensor which can provide over-temperature protection for the hookah.
3. The hookah is designed modularly, which facilitates the replacement of the tobacco material.

It will be obvious to those skilled in the art that changes and modifications may be made, and therefore, the aim in the appended claims is to cover all such changes and modifications.

The invention claimed is:

1. A hookah, comprising a heating assembly and a battery assembly connected to the heating assembly; wherein:

the heating assembly comprises a cup, a metal sheet, a magnetic induction coil, a base, a control panel, a temperature sensor configured to sense a temperature change of the hookah, a first insulation ring, a positive electrode, and a negative electrode;

the cup comprises high-temperature resistant non-metallic material and is configured to accommodate tobacco material;

the metal sheet is fixed in the cup and the cup is disposed in the magnetic induction coil;

when the magnetic induction coil is electrified, an eddy current is generated in the metal sheet whereby the metal sheet produces heat to heat the tobacco material;

the battery assembly comprises a plurality of batteries connected in series or in parallel;

the magnetic induction coil is fixed on the base, and a lead of the magnetic induction coil runs through the base;

an output end of the control panel is soldered on the lead of the magnetic induction coil to supply power to the magnetic induction coil;

the temperature sensor is disposed on the base and below the magnetic induction coil;

the first insulation ring is disposed on the base to separate positive and negative leads of the temperature sensor;

the positive electrode is disposed in the first insulation ring and is connected to the positive lead of the temperature sensor and an input positive electrode of the control panel;

the negative electrode is disposed outside the first insulation ring and is connected to the negative lead of the temperature sensor and an input negative electrode of the control panel; and the control panel is disposed on a screw thread of the negative electrode and fixed on the base to receive temperature information of the temperature sensor.

2. The hookah of claim 1, wherein the cup comprises an upper cover and the upper cover comprises a plurality of through holes.

3. The hookah of claim 2, wherein the metal sheet is in the form of mesh, cross shape, fan shape, or spiral shape.

4. The hookah of claim 3, wherein the heating assembly further comprises a thermal insulation cylinder disposed between the cup and the magnetic induction coil to protect the magnetic induction coil.

5. The hookah of claim 4, wherein the thermal insulation cylinder and the cup each comprise high-temperature resistant glass.

6. The hookah of claim 1, wherein the hookah further comprises a smoke filter, a first air passage, and a second air passage; wherein the smoke filter is filled with water; the first air passage comprises a first end connected to the heating assembly and a second end submerged in the water; the second air passage comprises a first end connected to a mouthpiece and a second end disposed above the liquid level of the water; when in use, the smoke produced by the heating assembly enters the water via the first air passage, is filtered by the water, comes out of the water, enters the second air passage, and is inhaled by a user.

* * * * *